(12) United States Patent
Grönhage et al.

(10) Patent No.: US 6,237,435 B1
(45) Date of Patent: May 29, 2001

(54) CONTROL DEVICE

(75) Inventors: Anders Grönhage, Bankeryd; Kenneth Skogward, Huskvarna, both of (SE)

(73) Assignee: Kongsberg Automotive AB (SE)

( * ) Notice: Subject to any disclaimer, the term of this patent is extended or adjusted under 35 U.S.C. 154(b) by 0 days.

(21) Appl. No.: 09/445,904

(22) PCT Filed: Jun. 26, 1998

(86) PCT No.: PCT/SE98/01277

§ 371 Date: Mar. 2, 2000

§ 102(e) Date: Mar. 2, 2000

(87) PCT Pub. No.: WO99/00265

PCT Pub. Date: Jan. 7, 1999

(30) Foreign Application Priority Data

Jun. 27, 1997 (SE) .................................................. 9702507

(51) Int. Cl.[7] ............................ F16H 59/04; B60K 20/04
(52) U.S. Cl. ................... 74/471 XY; 74/473.18; 74/473.28; 74/473.33; 74/473.34
(58) Field of Search ........................... 74/471 XY, 473.1, 74/473.18, 473.27, 473.33, 473.34

(56) References Cited

U.S. PATENT DOCUMENTS

| | | | |
|---|---|---|---|
| 3,744,335 | * | 7/1973 | Karlsson et al. .................... 74/471 X |
| 4,519,266 | * | 5/1985 | Reinecke .............................. 74/471 X |
| 4,912,997 | | 4/1990 | Malcolm et al. . |
| 5,309,784 | * | 5/1994 | Kobayashi et al. ................ 74/473.27 |
| 5,339,705 | * | 8/1994 | Shirahama et al. ................ 74/473.27 |

FOREIGN PATENT DOCUMENTS

| | | |
|---|---|---|
| 0 358 894 | 3/1990 | (EP) . |
| 0 756 112 A1 | 1/1997 | (EP) . |

* cited by examiner

*Primary Examiner*—David A. Bucci
*Assistant Examiner*—William C. Joyce
(74) *Attorney, Agent, or Firm*—Lerner, David, Littenberg, Krumholz & Mentlik, LLP (57) ABSTRACT

Apparatus for controlling the operational states of motor vehicle gears including a console, a lever mounted in the console whereby the lever can be articulated between a plurality of maneuverable positions corresponding to the operational states of the motor vehicle gears, the console comprising a housing and including a first groove and at least one track on at least one of the inner surfaces of the housing, a first support defining a first pivot hinge for the lever including a ball and socket joint whereby the first support permits the lever to pivot about an unlimited number of spatial pivot axes with respect to the housing, a second support defining a second pivot hinge, the first pivot hinge and the second pivot hinge defining a first pivot axis, whereby the lever can be maneuvered about the first pivot axis, and a third support having a longitudinal axis, the second support including a first pin mounted along the first pivot axis and prestressed toward the first groove, and the third support including a second pin mounted along the longitudinal axis of the third support and prestressed towards the at least one track.

4 Claims, 9 Drawing Sheets

CONTROL DEVICE

FIELD OF THE INVENTION

The present invention relates to a maneuvering apparatus, comprising a maneuvering lever and a maneuvering console and provided with at least a first pivot hinge by means of which the lever is articulated relative to the maneuvering console for switching between a number of maneuvering positions intended to be converted to corresponding operational states of a device which is to be maneuvered.

BACKGROUND OF THE INVENTION

For a general type of maneuvering apparatus, namely gear controls for motor vehicles, there are a number of known arrangements. These are generally designed in principle for a specific movement pattern, such as, for example, the gear controls for manual gear boxes or for automatic transmissions. The most common type of automatic transmissions are fully automatic with automatic gear changing between different gear stages, but in recent times automatic transmissions have been developed which give the driver the option to simply determine the desired gear position by lightly pivoting the gear lever to and fro with short movements.

An object of the present invention is to provide a basic design for maneuvering apparatus which can be used for several different types of maneuvering applications.

SUMMARY OF THE INVENTION

In accordance with the present invention, this and other objects have now been realized by the invention of apparatus for control of the operational states of a device comprising a maneuvering console, a maneuvering lever mounted in the maneuvering console whereby the maneuvering lever can be articulated between a plurality of maneuverable positions corresponding to the operational states of the device, the maneuvering console comprising a housing including a plurality of inner surfaces and including a first groove and at least one track on at least one of the plurality of inner surfaces, a first support member defining a first pivot hinge for the maneuvering lever and comprising a ball and socket joint whereby the first support member permits the maneuvering lever to pivot about an unlimited number of spatial pivot axes with respect to the housing, a second support member defining a second pivot hinge, the first pivot hinge and the second pivot hinge defining a first pivot axis, whereby the maneuvering lever can be maneuvered about the first pivot axis, and a third support member having a longitudinal axis, the second support member including a first pin member mounted along the first pivot axis and prestressed towards the first groove, and the third support member including a second pin member mounted along the longitudinal axis of the third support member and prestressed towards the at least one track.

In accordance with one embodiment of the apparatus of the present invention, the first pivot axis and the longitudinal axis of the third support member each intersect the first pivot hinge.

In accordance with another embodiment of the apparatus of the present invention, the apparatus includes a holder mounted on the maneuvering lever, the first and second pin members being mounted on the holder.

In accordance with another embodiment of the apparatus of the present invention, the at least one track includes a plurality of indentations, thereby defining a plurality of distinct positions for the maneuvering lever along the at least one track.

The objects of the present invention are achieved by means of a maneuvering apparatus which is characterized by the pivot hinge forming a first support member for the maneuvering lever in the maneuvering console, in that the pivot hinge is arranged to permit pivoting of the maneuvering lever relative to the maneuvering console about an unlimited number of spatial pivot axes, a second support member for the maneuvering lever relative to the maneuvering console forming a second pivot hinge for the maneuvering lever, which together with the first pivot hinge defines a pivot axis for the maneuvering lever, in that the second support member is prestressed towards a groove of the maneuvering apparatus, and a third support member forming a control member which is prestressed towards at least one defined track in the maneuvering apparatus.

BRIEF DESCRIPTION OF THE DRAWINGS

The present invention will be more fully appreciated with reference to the following detailed description, which in turn refers to the attached drawings, in which.

DETAILED DESCRIPTION

The maneuvering apparatus according to the present invention is, in the example shown, a gear control for automatic transmissions, in which there has also been included a function for manual selection of gear positions. The gear control is shown completely separate from the transmission functions which are needed to convert the mechanical positions of the gear control into the gear position of the gearbox. This can be done either by complete electrical detection and transmission of the gear control positions, mechanically by means of one or more wires or links, or alternatively by a combination of electrical and mechanical transmission.

The basic construction will first be described with reference to FIGS. 1–5 and consists in a known manner of a maneuvering lever 1 and a maneuvering console 2 in which the maneuvering lever is articulated in order to adopt different maneuvering positions. The maneuvering console is constructed as a housing with two side pieces, 3 and 4, and front and back pieces, of which the back piece has been removed for the sake of clarity, and a cover part 6 through which the maneuvering lever extends with its lever part 7 through a groove 8, which is configured according to the actual movement pattern of the lever. At the top, the maneuvering lever has a maneuvering knob (not shown) which is intended to be gripped by the driver for the purpose of selecting the maneuvering position.

The lever 1 thus protrudes into a space in the housing and is positionally controlled in the housing by means of three support members, i.e. three support points. At the bottom, the lever has a pivot hinge 9 which forms a defined hinge point 10 in the maneuvering console 2, representing the first support point. In the example shown, this support point or support member is formed by a ball 11 which is arranged at the lower end of the lever part 7 and is mounted in a socket 12 in a bottom part 13 of the maneuvering console. The pivot hinge 9 as such permits pivoting of the maneuvering lever in space about an unlimited number of different geometric pivot axes.

According to the present invention, the maneuvering lever 1 has a second support member 14 at a second support point which, together with the first support member, i.e. the pivot hinge 9, forms a pivot axis 16 for the maneuvering lever 1, which axis, in the example shown, can be adjusted relative to the maneuvering console 2. The pivot axis 16 is fixed in orientation relative to the lever part 7 and its longitudinal axis 18, but it can alternatively be fixed in orientation in the housing. The second support member 14 is designed as a spring-loaded piston pin 19 which at its outer end 21 is shaped as a ball which, by moving along a track, for example in grooves between defined points on the inner wall 23 of the maneuvering console 2, can be adjusted between different geometric axis positions, in the example shown two positions relative to the maneuvering console 2.

Figure 1:
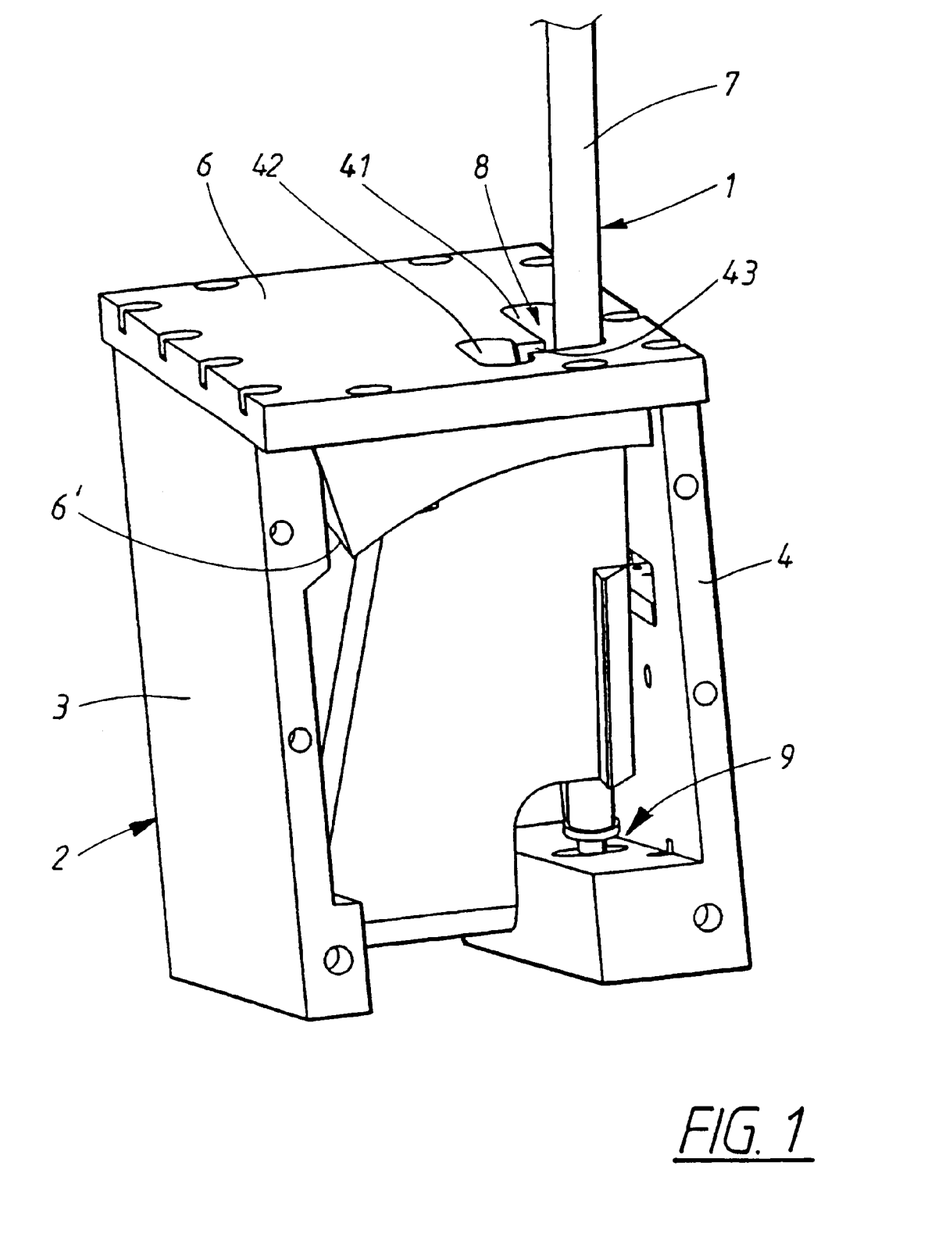
FIG. 1 is a rear perspective view of one embodiment of the maneuvering apparatus of the present invention in which a rear portion has been removed and the apparatus is in drive position D.
Figure 2:
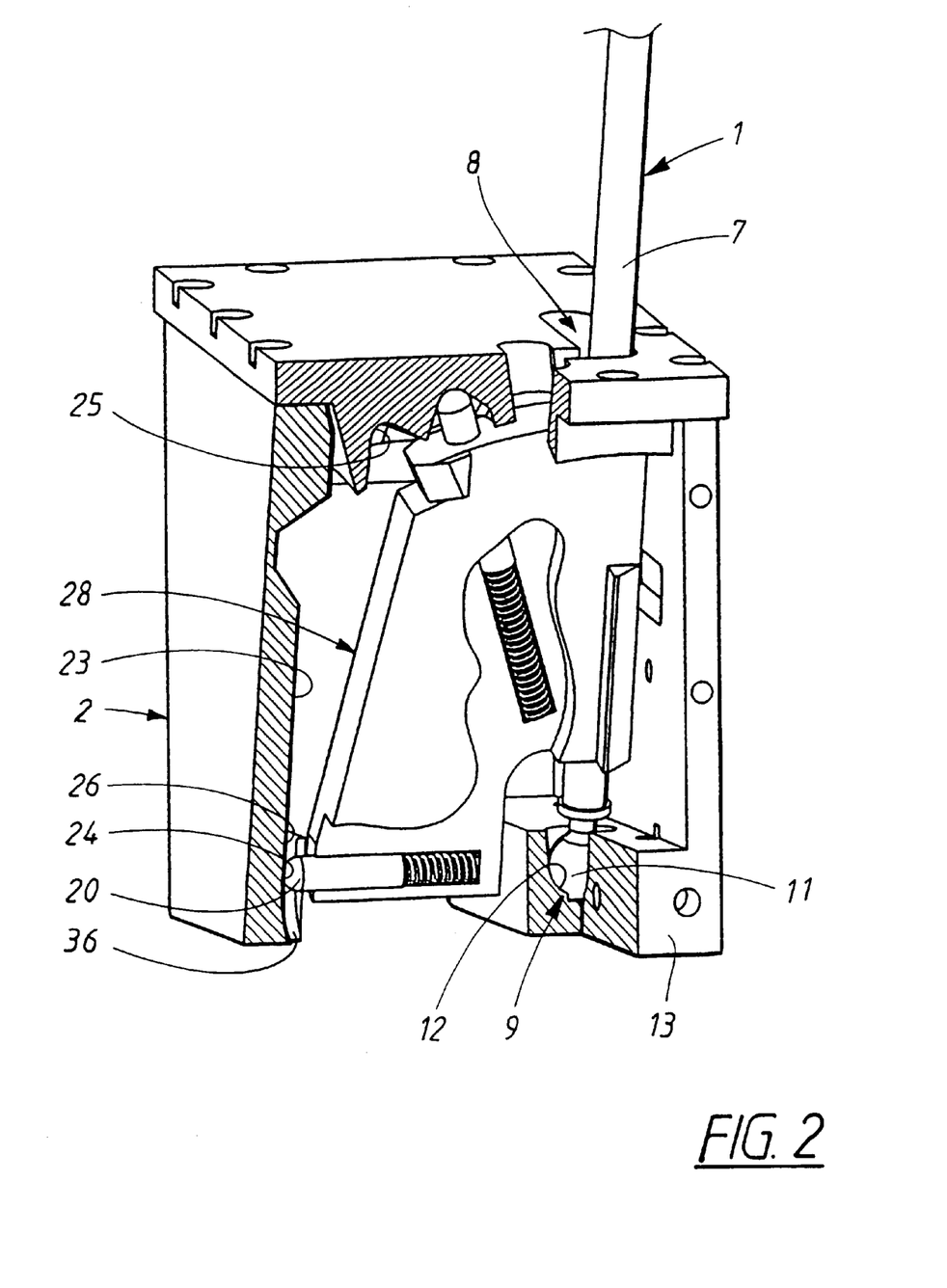
FIG. 2 is a rear perspective view, partially cut-away, of the maneuvering apparatus shown in FIG. 1.
Figure 3:
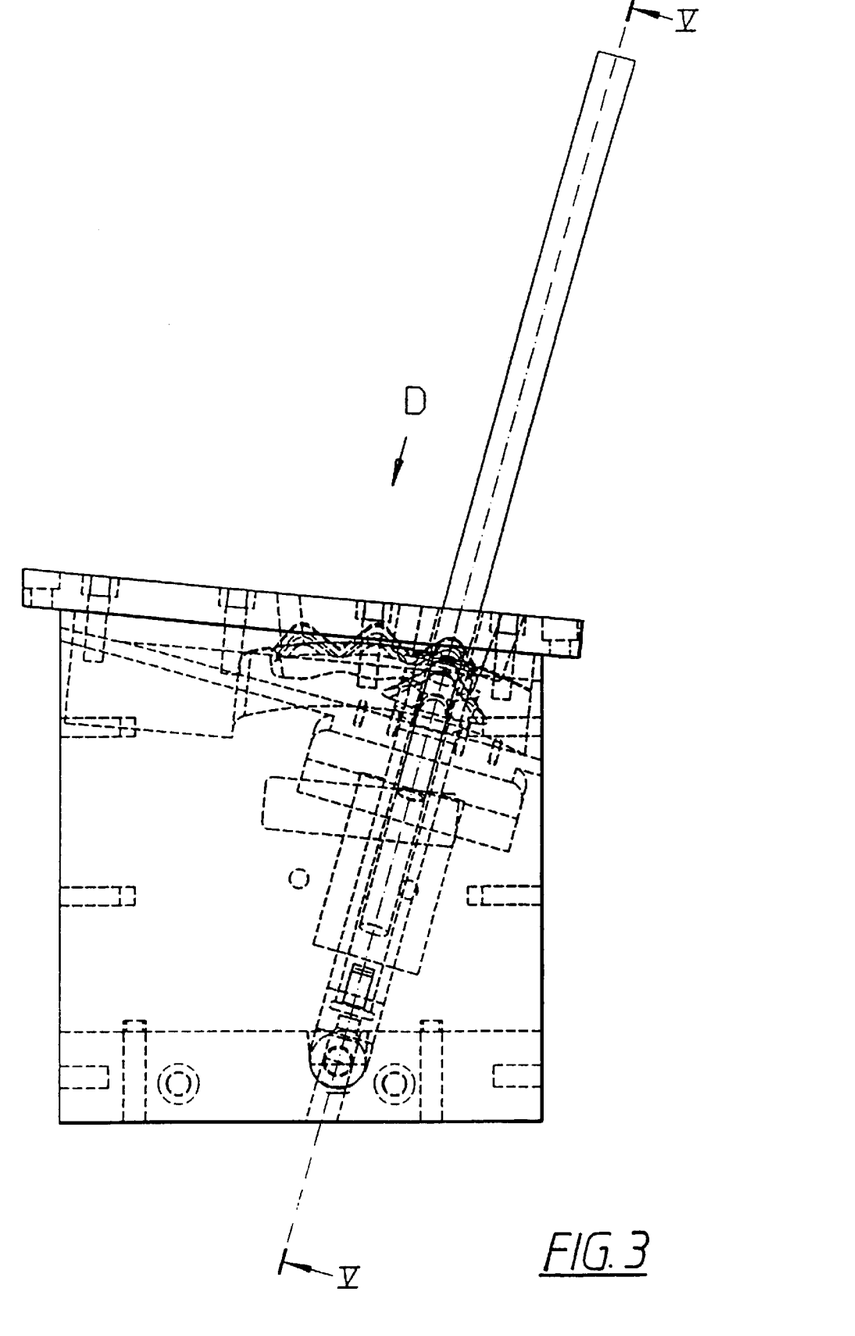
FIG. 3 is a side perspective view of the maneuvering apparatus shown in FIG. 1 in which the concealed parts are shown in phantom view.

In addition to a piece of the maneuvering console 2 being cut away in FIG. 2, a piece of the maneuvering lever 1 has also been removed, namely a piece of a holder 28 which is fixed to the lower end of the lever part 7 and, in the example shown, is designed as a plate-like piece which is provided with a first bore 29 in which the piston pin 19 is resiliently stressed by means of a compression spring 30 between the inside 23 of the maneuvering console 2 and the bottom of the axial bore. In a corresponding manner, a control member 15 in the form of a control pin 20 is fitted in a second bore 31 and stressed by means of a compression spring 32 between the bottom of the bore and the inside of the maneuvering console, more precisely different control tracks and catch positions on the inside of the cover part 6. The control member 15 forms the third support member, i.e. the third support point, which is displaceable along tracks, for example in grooves between different positions in the housing, more precisely the inside of the cover part, as will be described in more detail hereinbelow.

According to the present invention, the control member 15 controls the movement pattern of the maneuvering lever in cooperation with the control tracks, 27 and 37, which can be configured in accordance with the desired movement pattern.

Figure 6:
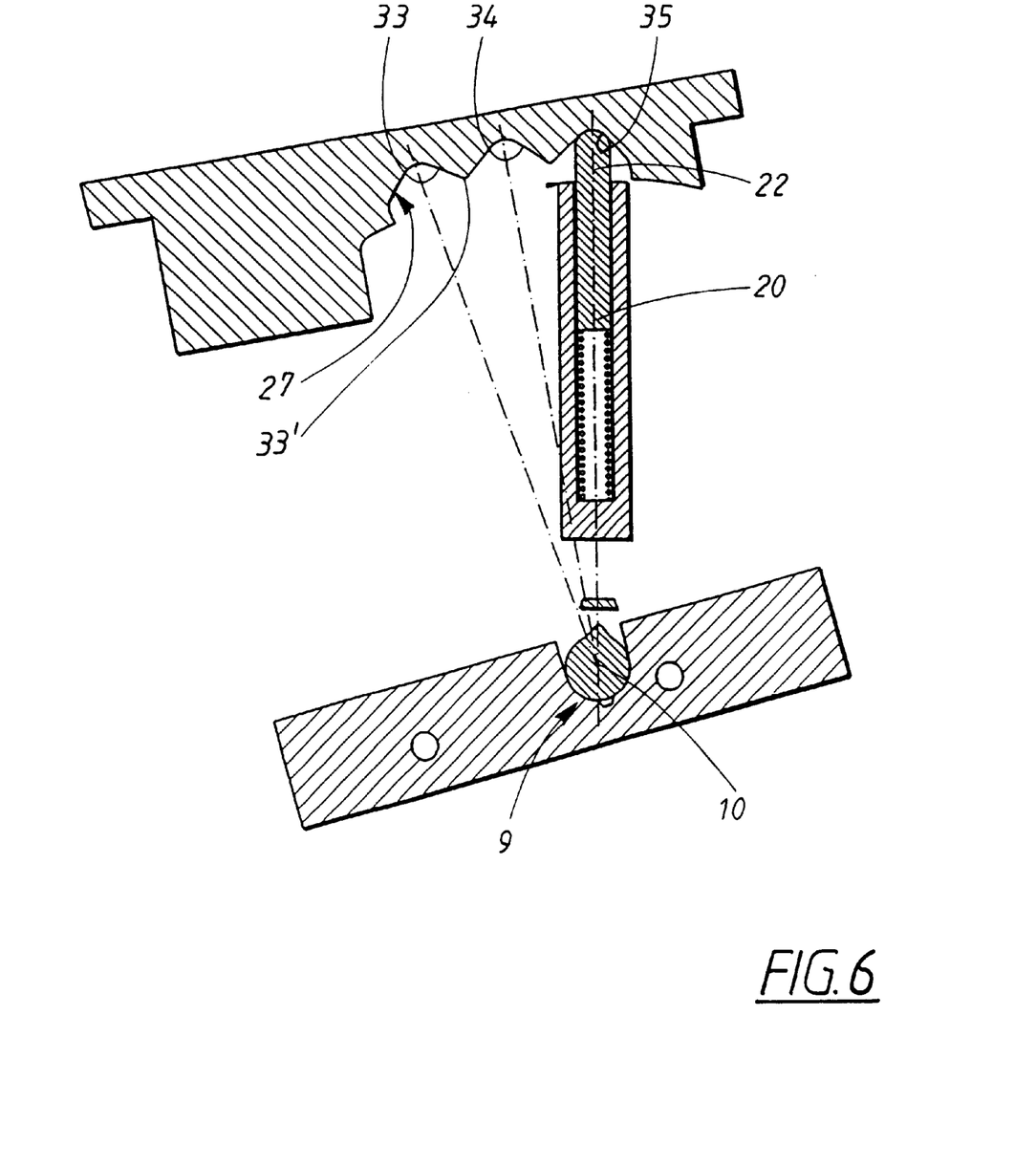
FIG. 6 is a front, elevational, cross-sectional view of a portion of the maneuvering apparatus shown in FIG. 5 taken along line VI thereof.

As can best be seen from FIG. 6, the control track 27 is designed as a recess with a number of catch positions in the form of indentations, 33, 34 and 35, in the track, these each representing a maneuvering position for the maneuvering lever 1. The catch positions can be overcome by applying an extra force to the lever. The required force is chosen by selecting the form of the indentations 33, 34 and 35, i.e. inclination of the edges and the height of the intermediate peaks 33 and spring constants of the spring 32. The catch positions can also be blocked by means of a locking mechanism (not shown) which has to be released before the lever is pivoted in a certain direction. In an automatic transmission, the three positions can represent, for example, reverse position R in catch position 33, neutral position N in catch position 34, and drive position D in catch position 35 (see also FIG. 4).

Figure 5:
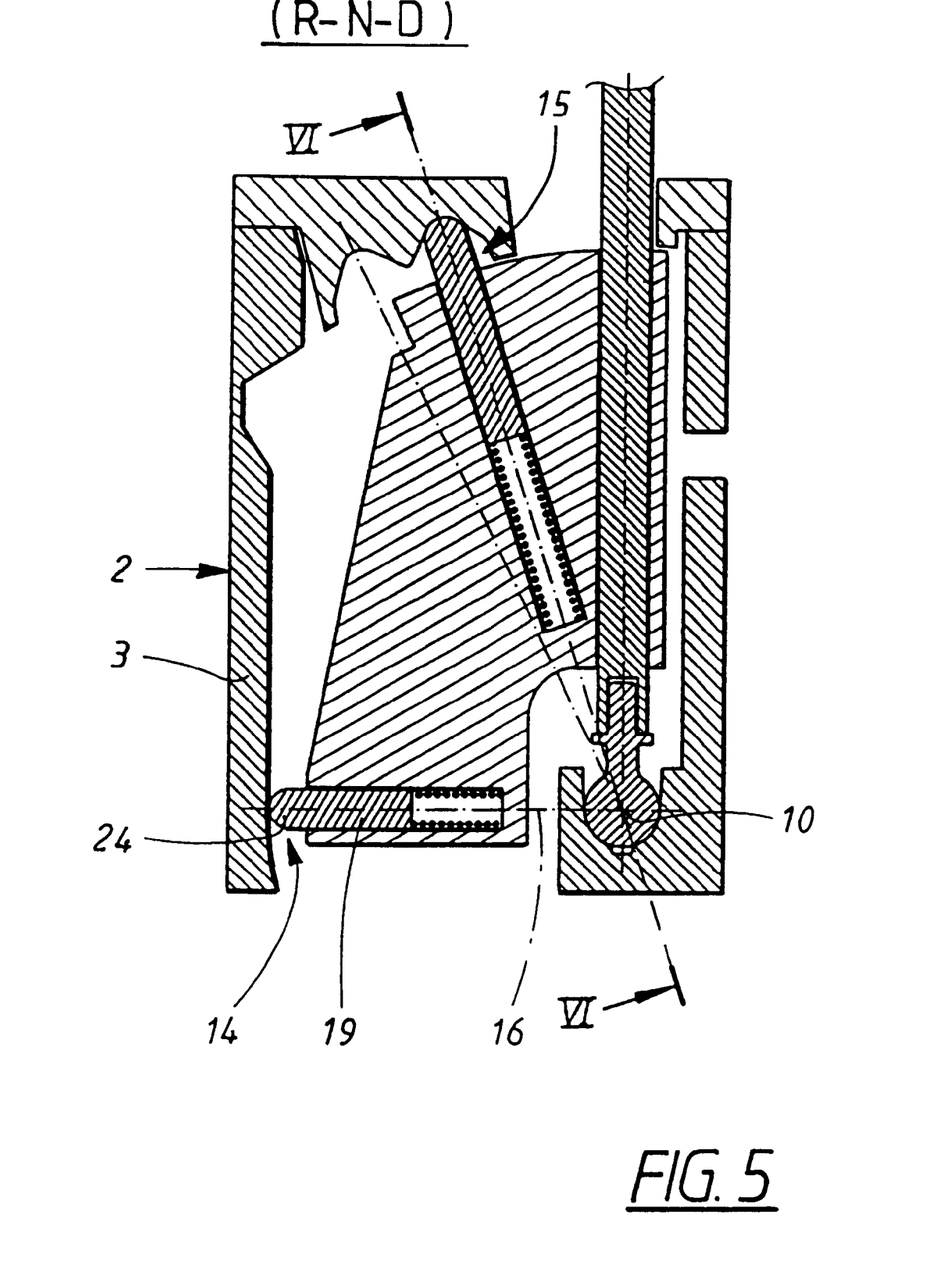
FIG. 5 is a side, elevational, cross-sectional view of the maneuvering apparatus shown in FIG. 3 taken along line IV—IV thereof.

The above-described catch positions in the track 27 are thus activated when the pivot hinge 14 is situated in the position shown in FIG. 5, with the piston pin 19 against the support point 24 on the maneuvering console 2.

Figure 7:
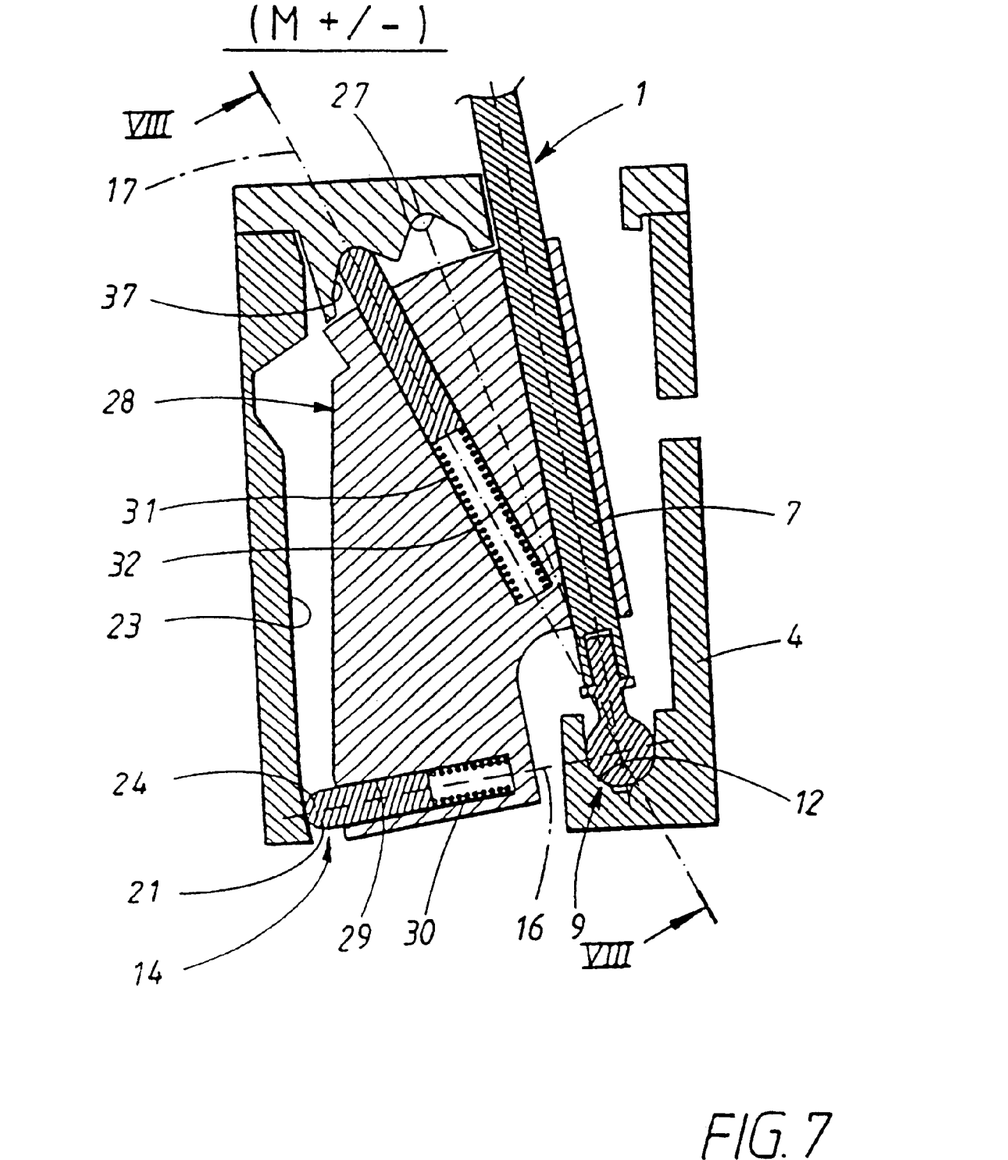
FIG. 7 is a front, elevational, cross-sectional view of a portion of the maneuvering apparatus of the present invention as shown in FIG. 5, but in position M.

In the example shown in FIG. 7, the support point 24 can be displaced along the inside of the maneuvering console 2 by means of the fact that the piston pin 19 with its end 21 is movable in a groove 36 in the maneuvering console, at the same time as the control pin 20 can be switched from the track 27 to a second track 37. This has a neutral position 38 in the form of the bottom of a recess which creates a resistance that has to be overcome in order to displace the end 22 of the locking pin 20 to one of the two inclined portions, 39 and 40, of the track 37. This track represents an alternative gear change mode in which the automatic gear change is replaced by a manually activated gear change by moving the lever forwards to position+ or backwards to position– from a neutral position M (see FIG. 4), it being possible to change up gear or change down gear for each movement forwards or backwards, respectively.

Figure 4:
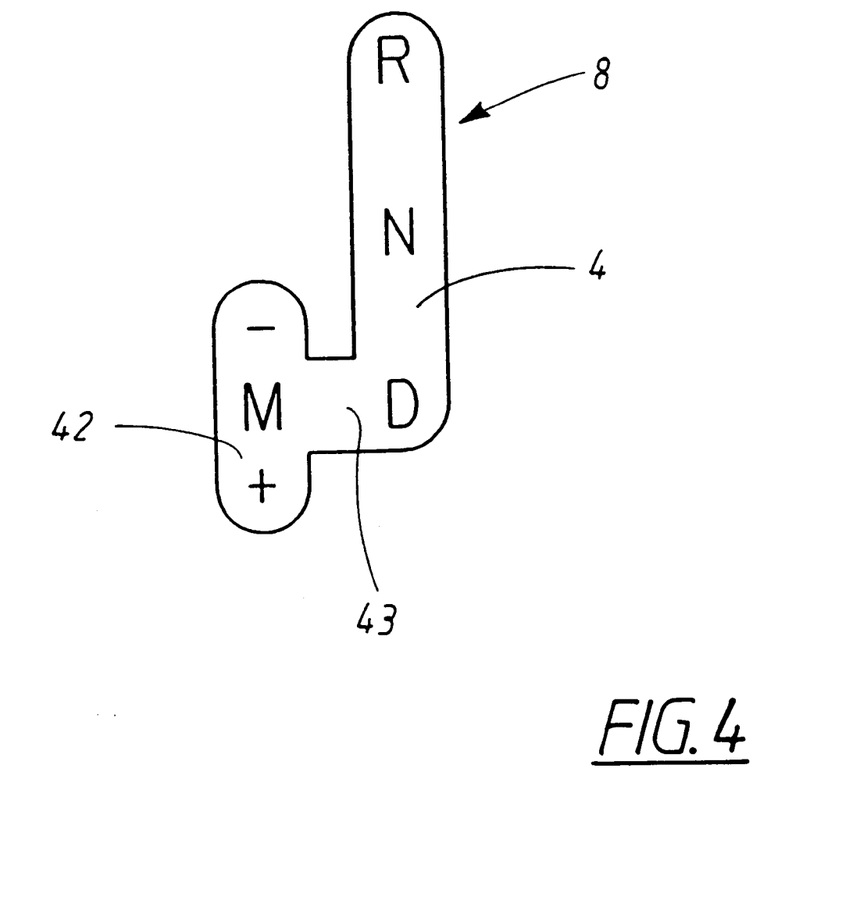
FIG. 4 is a representation of a groove included in a maneuvering apparatus of the present invention demonstrating an example of a movement pattern for the maneuvering lever thereof.
Figure 8:
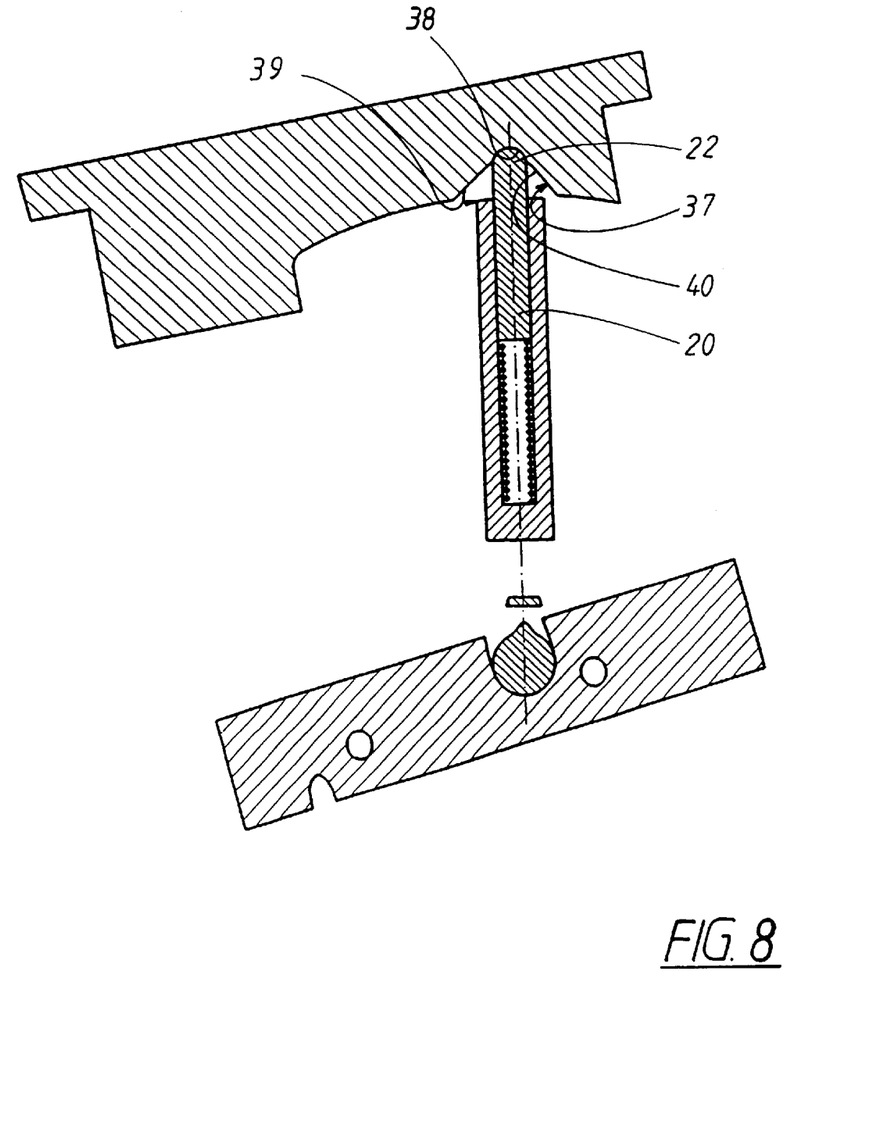
FIG. 8 is a front, elevational, cross-sectional view of a portion of the maneuvering apparatus of the present invention as shown in FIG. 7 taken along line VIII—VIII thereof.

In order to permit the movement pattern described above by way of example, the groove 8, as can best be seen from FIG. 4, is designed with a main groove 41 which is used for choosing between catch positions for the track 27, and a side groove 42 for the alternative gear change mode with the catch pin 22 in the track 37 according to FIGS. 7 and 8. For transfer between the two grooves, there is a transverse groove 43 for the lever part 7, which groove 43 defines a transverse path with a raised part which defines the stop position.

With the above-described embodiment, no play whatsoever occurs because the pivot hinge of the maneuvering lever, i.e. the first support point, is prestressed, on the one hand, from the side by means of the second support point, i.e. the piston pin 19, and, on the other hand, from above by means of the third support point, i.e. the catch pin 20. The normal maneuvering forces are taken up by the first pivot hinge 9 and the control member, while the groove 8 in the cover part 6 takes up overload forces and thus protects the support member against damage. The support members in the maneuvering apparatus can therefore be given relatively small dimensions.

As will be evident from the figures, the upper edge 28' of the holder 28 and the underside 6' of the cover part have a spherical shape with a curvature whose center of curvature lies at the pivot center of the lever 1. The spherical surfaces facing each other form bearing surfaces against each other and they have a clearance which is chosen to limit lifting movements of the lever.

Figure 9:
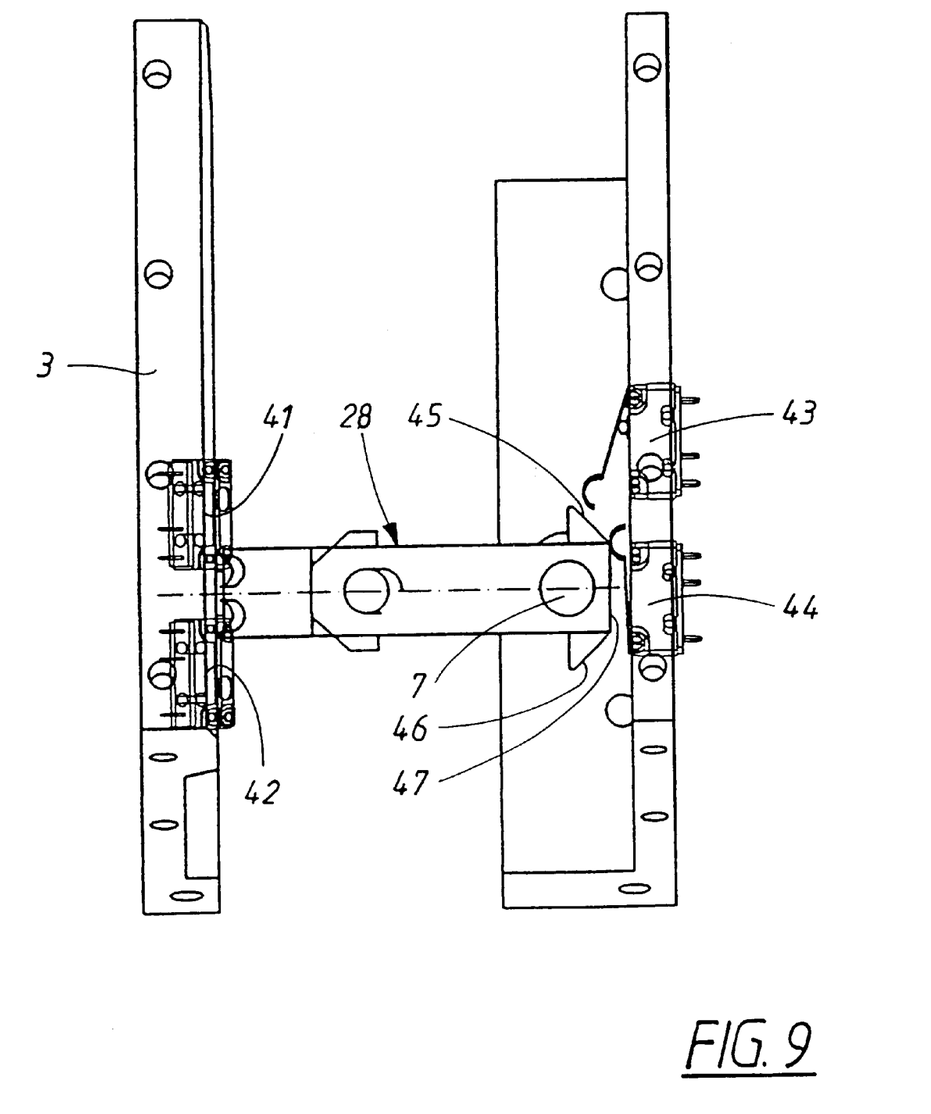
FIG. 9 is top, elevational view of a portion of the maneuvering apparatus of the present invention in which the cover has been removed therefrom.

Finally, FIG. 9 shows a top view in which the cover part and the front and back pieces have been removed, that is to say only the side pieces, 3 and 4, of the maneuvering console 2 are depicted. Arranged in the side pieces there are switching members, 41, 42, 43, and 44, which, in the example shown, are four in number and consist, for example, of micro switches, which, when coupled in a suitable manner into a current circuit, can form logic functions which give information on the various positions of the gear lever 1. The switches are provided with sensor arms which, by cooperating with bevelled control surfaces, 25, 46, 47, and of the holder 28, switch the switches, which can give information on the different positions in the ordinary gear change mode.

In FIG. 9, the lever is shown, by way of example in gear change position D, in which case the switch 4 is unactuated, e.g. open, and the switch 44 is actuated, e.g. closed. In position N, both switches are actuated, while in position R the switch 43 is unactuated. This information can be used for electrical transmission to the gearbox, e.g. by means of solenoid-controlled valves. The gear change positions in the alternative gear change mode in groove 42 can also be detected in cooperation with the two switches, 41 and 42, which in this case advantageously detect the two alternative positions of the pin 19 according to FIGS. 5 and 7, respectively. The use of two switches for logic control is described in greater detail in Swedish Patent Application No. 9600847-9.

The present invention is not limited to the illustrative embodiment described above and shown in the drawing, and instead it can be varied within the scope of the attached claims. For example, it is in principle conceivable for the control pin 20 to serve as pivot axle in the alternative gear change mode, in which case the pin 19 is allowed to execute a sideways movement, i.e. the axle functions change between two axles. Both pins can instead be axially mounted in the housing and stressed against surfaces of the holder.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for control of the operational states of a device comprising a maneuvering console, a maneuvering lever mounted in said maneuvering console whereby said maneuvering lever can be articulated between a plurality of maneuverable positions corresponding to said operational states of said device, said maneuvering console comprising a housing including a plurality of inner surfaces and including a first groove and at least one track on at least one of said plurality of inner surfaces, a first support member defining a first pivot hinge for said maneuvering lever and comprising a ball and socket joint whereby said first support member permits said maneuvering lever to pivot about an unlimited number of spatial pivot axes with respect to said housing, a second support member defining a second pivot hinge, said first pivot hinge and said second pivot hinge defining a first pivot axis, whereby said maneuvering lever can be maneuvered about said first pivot axis, and a third support member having a longitudinal axis, said second support member including a first pin member mounted along said first pivot axis and prestressed towards said first groove, and said third support member including a second pin member mounted along said longitudinal axis of said third support member and prestressed towards said at least one track.

2. The apparatus of claim 1 wherein said first pivot axis and said longitudinal axis of said third support member each intersect said first pivot hinge.

3. The apparatus of claim 1 including a holder mounted on said maneuvering lever, said first and second pin members being mounted on said holder.

4. The apparatus of claim 1 wherein said at least one track includes a plurality of indentations, thereby defining a plurality of distinct positions for said maneuvering lever along said at least one track.

\* \* \* \* \*